(12) United States Patent
Hu et al.

(10) Patent No.: US 10,539,298 B2
(45) Date of Patent: Jan. 21, 2020

(54) COLOR WHEEL WITH COLOR CORRECTION AND HEAT DISSIPATION STRUCTURES

(71) Applicant: APPOTRONICS CHINA CORPORATION, Shenzhen (CN)

(72) Inventors: Fei Hu, Shenzhen (CN); Jiayi Yang, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/548,979

(22) PCT Filed: Jan. 28, 2016

(86) PCT No.: PCT/CN2016/072446
§ 371 (c)(1),
(2) Date: Aug. 4, 2017

(87) PCT Pub. No.: WO2016/127816
PCT Pub. Date: Aug. 18, 2016

(65) Prior Publication Data
US 2018/0024424 A1 Jan. 25, 2018

(30) Foreign Application Priority Data
Feb. 9, 2015 (CN) .................... 2015 2 0093109 U

(51) Int. Cl.
*F21V 9/08* (2018.01)
*F21V 9/30* (2018.01)
(Continued)

(52) U.S. Cl.
CPC ............... *F21V 9/40* (2018.02); *F21V 9/08* (2013.01); *F21V 14/08* (2013.01); *F21V 29/502* (2015.01);
(Continued)

(58) Field of Classification Search
CPC ........ G02B 26/008; F21S 10/007; F21V 9/08; F21V 9/30; F21V 9/40; F21V 14/08; G03B 21/14
See application file for complete search history.

(56) References Cited

U.S. PATENT DOCUMENTS

| | | | | |
|---|---|---|---|---|
| 7,018,051 B2* | 3/2006 | Bok | ...................... | G03B 21/16 348/743 |
| 7,230,656 B2* | 6/2007 | Penn | ...................... | G02B 7/008 348/743 |

(Continued)

FOREIGN PATENT DOCUMENTS

| | | |
|---|---|---|
| CN | 1725099 A | 1/2006 |
| CN | 101359076 A | 2/2009 |

(Continued)

OTHER PUBLICATIONS

International Search Report in the parent PCT application No. PCT/CN2016/072446, dated Apr. 1, 2017.

(Continued)

*Primary Examiner* — Ismael Negron
(74) *Attorney, Agent, or Firm* — Chen Yoshimura LLP

(57) ABSTRACT

A color wheel includes a phosphor wheel, a color correction wheel, a rotation shaft, and a metal piece fixed on the rotation shaft, and the phosphor wheel and the color correction wheel are fixed together with the metal piece, such that they both contact the metal piece and heat generated by the phosphor wheel can be quickly transmitted to the metal piece and the color correction wheel and emitted into the air to cool the phosphor wheel.

13 Claims, 3 Drawing Sheets

(51) Int. Cl.

| | |
|---|---|
| *F21V 9/40* | (2018.01) |
| *F21V 29/502* | (2015.01) |
| *F21V 29/60* | (2015.01) |
| *F21V 29/70* | (2015.01) |
| *F21V 14/08* | (2006.01) |
| *G03B 21/16* | (2006.01) |
| *G03B 21/20* | (2006.01) |
| *G03B 33/08* | (2006.01) |

(52) U.S. Cl.
CPC .............. *F21V 29/60* (2015.01); *F21V 29/70* (2015.01); *G03B 21/16* (2013.01); *G03B 21/204* (2013.01); *G03B 33/08* (2013.01)

(56) References Cited

U.S. PATENT DOCUMENTS

| | | | |
|---|---|---|---|
| 8,556,437 B2* | 10/2013 | Miyake | F21V 7/22 |
| | | | 362/84 |
| 9,360,175 B2* | 6/2016 | Eberhardt | H01L 33/501 |
| 9,503,700 B2* | 11/2016 | Dai | H04N 9/3158 |
| 9,651,236 B2* | 5/2017 | Adema | F21V 29/503 |
| 9,733,557 B2* | 8/2017 | Furuyama | G02B 26/008 |
| 2006/0256300 A1* | 11/2006 | Chin | G03B 21/14 |
| | | | 353/81 |
| 2009/0034105 A1* | 2/2009 | Ho | G02B 7/008 |
| | | | 359/892 |
| 2009/0073591 A1 | 3/2009 | Chou | |
| 2013/0088471 A1 | 4/2013 | Kitano | |
| 2016/0252722 A1* | 9/2016 | Li | G02B 26/008 |
| | | | 362/84 |
| 2016/0274353 A1* | 9/2016 | Ando | C09K 11/02 |
| 2017/0242241 A1* | 8/2017 | Nojima | G02B 26/008 |
| 2017/0293211 A1* | 10/2017 | Kobayashi | G03B 21/00 |

FOREIGN PATENT DOCUMENTS

| | | |
|---|---|---|
| CN | 101393312 A | 3/2009 |
| CN | 102722014 A | 10/2012 |
| CN | 102736207 A | 10/2012 |
| CN | 102854723 A | 1/2013 |
| CN | 103226283 A | 7/2013 |
| CN | 204420882 U | 6/2015 |
| JP | 2013-092752 A | 5/2013 |
| JP | 2015-011302 A | 1/2015 |

OTHER PUBLICATIONS

IPRP in the parent PCT application No. PCT/CN2016/072446, dated Aug. 15, 2017.
Japanese Office Action, dated Jul. 17, 2018 in a counterpart Japanese patent application, No. JP 2017-541841.

* cited by examiner

COLOR WHEEL WITH COLOR CORRECTION AND HEAT DISSIPATION STRUCTURES

BACKGROUND OF THE INVENTION

Field of the Invention

This invention relates to light source technology, and in particular, it relates to a color wheel with color correction and heat dissipation structures.

Description of Related Art

Reflective type phosphor color wheels are widely used in projectors. When a color correction wheel is provided, the output wavelength ranges can be accurately selected, to accomplish desired separation and processing of different colors, so as to achieve desired color saturation. Such a device is shown in FIG. 1 and FIG. 2, which includes a mounting member 101, a color correction plate 201, a motor 301, a ceramic substrate 401, a phosphor layer 501, a collection lens 601, reflectors 701 and 801, and an adhesive layer 901 between the ceramic substrate and the motor. An input light illuminates the phosphor layer, which excites the phosphor material to generate a converted light. The converted light is reflected twice by the reflectors to reach the color correction plate. Light of desired wavelength range is selectively transmitted through the color correction plate to obtain desired saturated color. Multiple color segments of the color wheel and multiple color segments of the color correction wheel have spatial correlation with each other.

SUMMARY

A problem of the above structure is that, due to the size limitation of the light source, the size of the color correction wheel cannot be too large, and correspondingly, the size of the phosphor wheel is even smaller. When an excitation light with a high power intensity illuminates the phosphor wheel, the phosphor wheel is heated locally in a small region. Because there lacks sufficient heat conducting area to conduct heat away, the heat accumulates. This can cause the phosphor wheel to fail, limiting its life and can even burn the phosphor wheel.

To solve this problem, embodiments of the present invention provide a color wheel with an efficient heat dissipation structure.

In one aspect, the present invention provides a color wheel with color correction and heat dissipation structures, which includes: a phosphor wheel, a color correction wheel, a rotation shaft, and a metal piece, wherein the metal piece is affixed to the rotation shaft, and wherein the phosphor wheel and the color correction wheel are affixed to the metal piece and are in contact with the metal piece.

Further, the phosphor wheel and the color correction wheel are affixed to the metal piece by adhesion or welding.

Further, the metal piece is a round plate, its diameter being larger than an outer diameter of the phosphor wheel and smaller than an outer diameter of the color correction wheel.

Further, the color wheel also includes a mounting member, wherein the phosphor wheel and the color correction wheel are located on two different sides of the metal piece, and wherein the mounting member affixes the color correction wheel on the rotation shaft.

Further, a transparent glass plate is provided and located outside of the phosphor wheel.

Further, the metal piece has a vertical upwardly extending round rim at its periphery, wherein the rim forms a circle and the phosphor wheel is located within the circle of the metal piece.

Further, the phosphor wheel includes a phosphor layer and a setting layer, wherein the setting layer restrains the phosphor layer within the circle formed by the metal piece.

Further, the phosphor wheel and the color correction wheel are located on a same side of the metal piece.

Further, the phosphor wheel is inserted into concentric with the color correction wheel.

Further, a heat dissipation structure is provided and disposed on a side of the metal piece opposite the phosphor wheel and the color correction wheel.

Further, the heat dissipation structure is an impeller having spiral shaped blades.

Further, the color correction wheel is formed of a material having a high thermal conductivity.

Further, the rotation shaft and the metal piece are formed integrally as one piece.

The color wheel according to embodiments of the present invention has many advantages. Because the phosphor wheel and the color correction wheel are affixed to a metal piece, the heat generated by the phosphor wheel can be rapidly transmitted to the metal piece and the color correction wheel, and dissipated to the air by the metal piece and the color correction wheel. This increases hear dissipation area and heat dissipation efficiency.

DETAILED DESCRIPTION OF PREFERRED EMBODIMENTS

Figure 1:
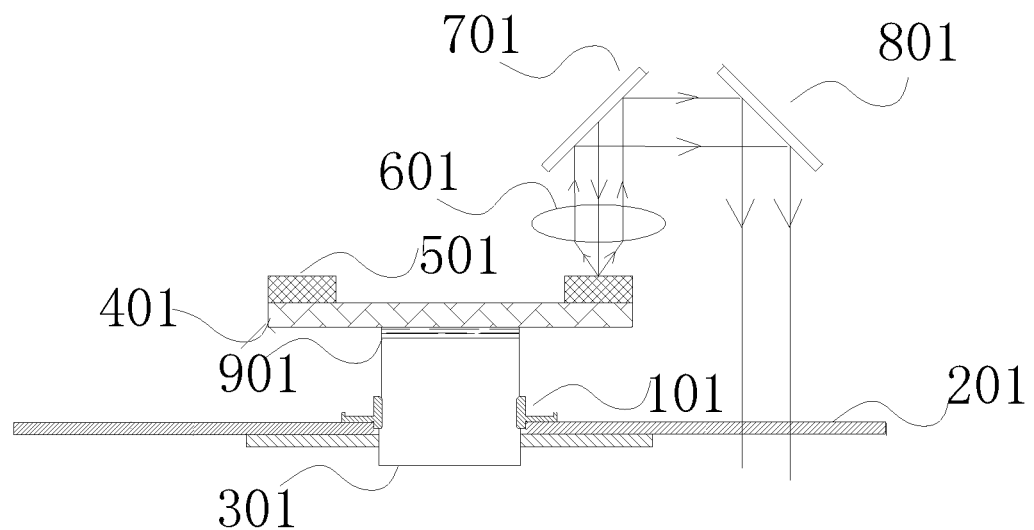
FIG. 1 schematically illustrates the structure of a conventional color wheel with color a correction wheel.
Figure 2:
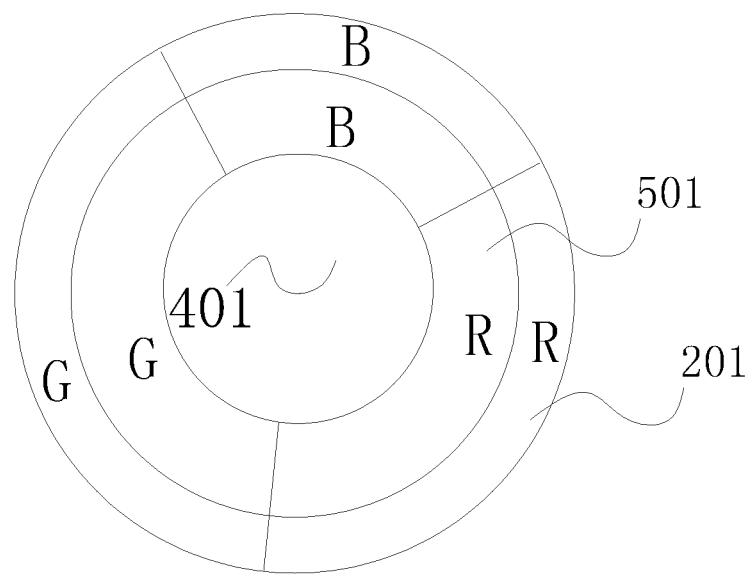
FIG. 2 is a top view of the conventional color wheel.

Note that in drawing FIGS. 3-7, similar reference numerals designate similar structures. For example, reference numerals 31, 41, 51, 61 and 71 all designate a phosphor wheel; reference numerals 32, 42, 52, 62 and 72 all designate a color correction wheel; reference numerals 33, 43, 53, 63 and 73 all designate a rotation shaft; and reference numerals 34, 44, 54, 64 and 74 all designate a metal piece.

First Embodiment

Figure 3:
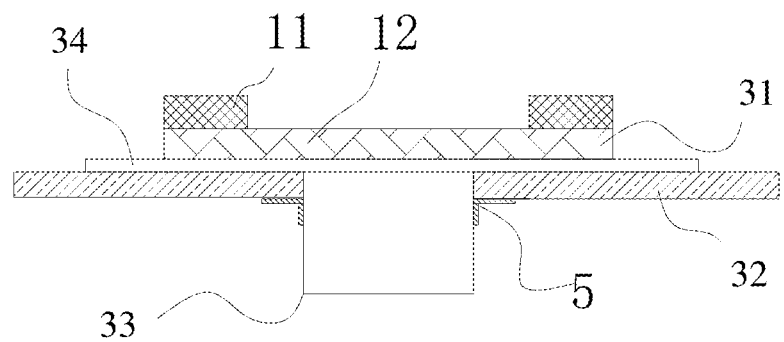
FIG. 3 schematically illustrates the structure of a color wheel with color correction and heat dissipation structures according to a first embodiment of the present invention.

As shown in FIG. 3, a color wheel with color correction and heat dissipation structures according to the first embodiment includes a phosphor wheel 31, a color correction wheel 32, a rotation shaft 33, a metal piece 34 and a mounting member 5.

The phosphor wheel 1 includes a phosphor layer 11 and a reflective layer 12. The excitation light illuminates the phosphor layer 11 to generate a monochromatic blue, green or red light. The reflective layer 12 is a ceramic substrate or a sapphire glass plate coated with a reflective coating. The reflective layer 12 reflects the light that has passed through the phosphor layer 11. The reflective layer 12 is a round plate, and the phosphor layer 11 is formed on one side of the reflective layer 12, forming a ring shaped phosphor layer.

The color correction wheel 32 is a round plate with a through hole in its center, and has a diameter larger than that of the phosphor wheel 31. The color correction wheel 32 and the phosphor wheel 31 are affixed to two different sides of the metal piece 34. The monochromatic light passes through the color correction wheel 32 to become more saturated monochromatic light. The color correction wheel 32 is formed of a material having a high thermal conductivity, and has superior thermal conductivity and heat dissipation ability.

The metal piece 34 is a round plate made of metal. Its diameter is larger than an outer diameter of the phosphor wheel 1 and smaller than an outer diameter of the color correction wheel 32.

In the orientation of FIG. 3, the phosphor wheel 31 is adhered to or welded to the top side of the metal piece 34. The color correction wheel 32 is affixed by the mounting member 5 below the metal piece 34, and is adhered to or welded to the metal piece 34. The color correction wheel 32 is also affixed on the rotation shaft 33. The metal piece 34 is welded to the rotation shaft 33. In other embodiments, the metal piece 34 and the rotation shaft 33 are made of the same metal material and integrated into one piece.

The rotation shaft 33 is coupled to the output end of an external motor, for driving the phosphor wheel 31 and the color correction wheel 32 to rotate synchronously.

In this embodiment, because the phosphor wheel 1 and the color correction wheel 32 are respectively affixed to the metal piece 34, the heat generated by the phosphor wheel 31 can be rapidly conducted to the metal piece 34 and the color correction wheel 32, and dissipated to the air by the metal piece 34 and the color correction wheel 32. This increases the heat dissipation area and heat dissipation efficiency.

Second Embodiment

Figure 4:
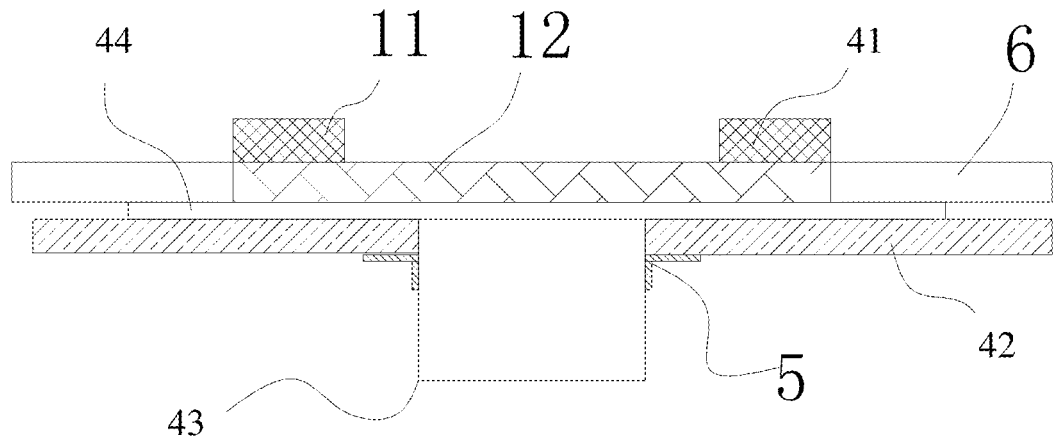
FIG. 4 schematically illustrates the structure of a color wheel with color correction and heat dissipation structures according to a second embodiment of the present invention.

As shown in FIG. 4, a color wheel with color correction and heat dissipation structures according to the second embodiment is similar to the color wheel of the first embodiment, but has an additional transparent glass plate 6.

The transparent glass plate 6 is affixed to the outer periphery of the phosphor wheel 41 by adhesion or melting. A part of the transparent glass plate 6 is in direct contact with the metal piece 44. In other embodiments, a gap is provided between the transparent glass plate 6 and the metal piece 44, for ventilation and heat dissipation. The transparent glass plate 6 acts as an extension of the edge of the phosphor wheel 41, and can dissipate the heat generated by the phosphor wheel 41 into the air, effectively increasing the heat dissipation area. Meanwhile, because it is a transparent glass material, it does not affect the light transmission.

Third Embodiment

Figure 5:
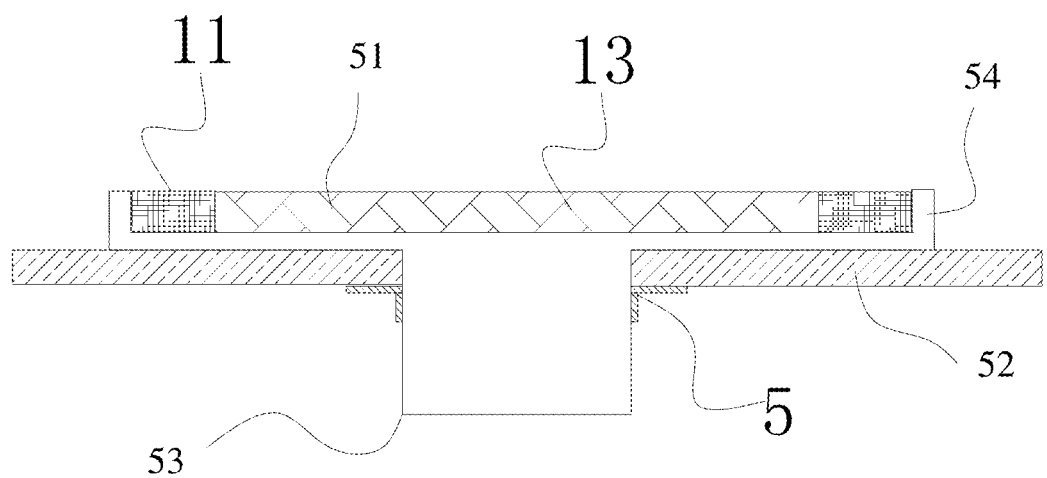
FIG. 5 schematically illustrates the structure of a color wheel with color correction and heat dissipation structures according to a third embodiment of the present invention.

As shown in FIG. 5, a color wheel with color correction and heat dissipation structures according to the third embodiment is similar to the color wheel of the first embodiment, but the color correction wheel 52 and the metal piece 54 have different structures.

The metal piece 54 has a vertical upwardly extending round rim at the periphery of the round metal plate. The phosphor wheel 51 includes a phosphor layer 11 and a setting layer 13. The setting layer 13 may be a sapphire plate, a glass plate, a ceramic plate, a quartz plate or a metal plate. The phosphor layer 11 is affixed in a ring shaped area between the rim of the metal piece 54 and the setting layer 13, so the phosphor layer 11 has a ring shape. The other side of the metal piece 5 that is opposite the rim is affixed to the color correction wheel 52.

In the color wheel of this embodiment, the metal piece 4 surrounds the phosphor layer 11, and the phosphor layer 11 is in direct contact with the metal piece 4, which enables rapid heat transmission to the metal piece 54, providing more efficient heat dissipation.

Fourth Embodiment

Figure 6:
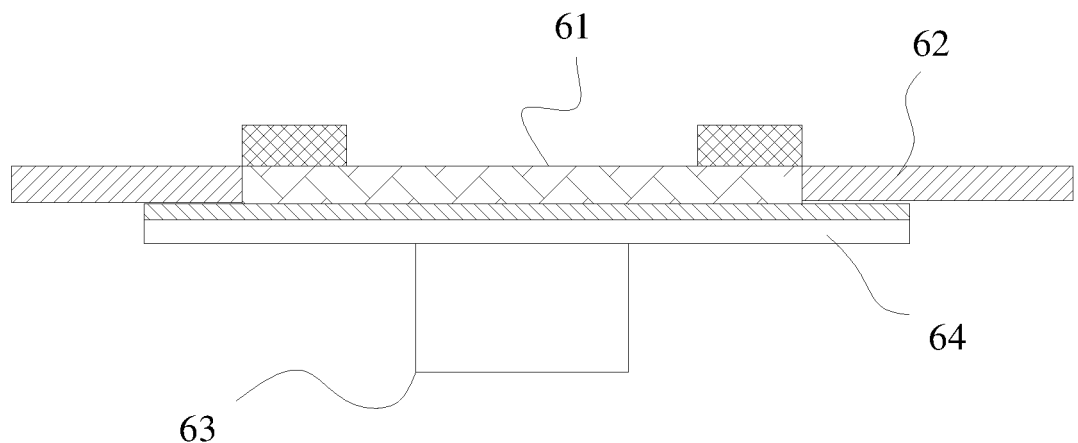
FIG. 6 schematically illustrates the structure of a color wheel with color correction and heat dissipation structures according to a fourth embodiment of the present invention.

As shown in FIG. 6, a color wheel with color correction and heat dissipation structures according to the fourth embodiment is similar to the color wheel of the first and second embodiments, but the relative positions of the phosphor wheel 61 and color correction wheel 62 is different.

In this embodiment, the phosphor wheel 1 and the color correction wheel 62 are affixed on the same side of the metal piece 64 by adhesion or welding. The phosphor wheel 61 is inserted in the middle of the color correction wheel 62, and the two are concentric.

The heat generated by the phosphor wheel 61 can be simultaneously transmitted to the metal piece 64 below it and the color correction wheel 62 outside of it. This increases heat dissipation speed and heat dissipation effect.

Fifth Embodiment

Figure 7:
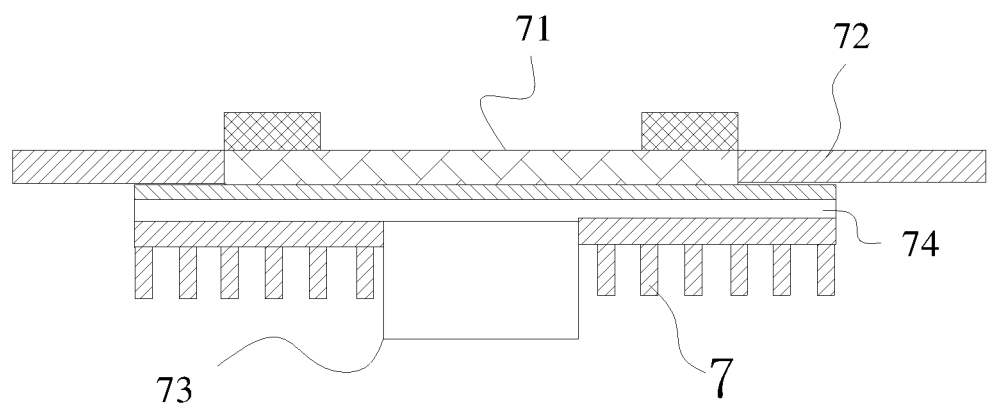
FIG. 7 schematically illustrates the structure of a color wheel with color correction and heat dissipation structures according to a fifth embodiment of the present invention.

As shown in FIG. 7, a color wheel with color correction and heat dissipation structures according to the fifth embodiment is based on the above embodiments, with an added heat dissipation structure 7.

Figure 8:
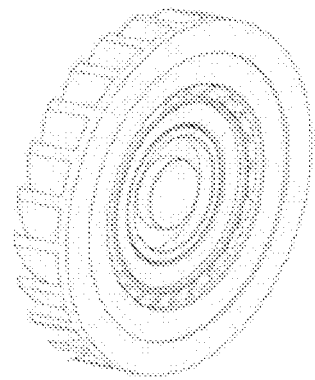
FIG. 8 schematically illustrates the heat dissipation structure in the color wheel according to embodiments of the present invention.

As shown in FIG. 8, the heat dissipation structure 7 is an impeller having spiral shaped blades. The heat dissipation structure 7 has a through hole in the middle for accommodating the rotation shaft 3; it is affixed to the rotation shaft 3 and is in contact with the metal piece 4. The heat dissipation structure 7 not only increases the heat dissipation area, but also generates air flow by the blades when it rotates. This can dissipate heat more rapidly.

Various embodiments are described above. It will be apparent to those skilled in the art that various modification and variations can be made in the color wheel with heat dissipation structure of the present invention without departing from the spirit or scope of the invention. Thus, it is intended that the present invention cover modifications and variations that come within the scope of the appended claims and their equivalents.

What is claimed is:

1. A color wheel with color correction and heat dissipation structures, comprising:
 a phosphor wheel;
 a color correction wheel;
 a rotation shaft; and
 a metal piece, wherein the metal piece is affixed to the rotation shaft, and wherein the phosphor wheel and the color correction wheel are affixed to the metal piece and are in contact with the metal piece.

2. The color wheel of claim 1, further comprising at least one of an adhesive layer or a weld, for affixing the phosphor wheel and the color correction wheel to the metal piece.

3. The color wheel of claim 1, wherein the color correction wheel is formed of a material having a high thermal conductivity.

4. The color wheel of claim 1, wherein the rotation shaft and the metal piece are formed integrally as one piece.

5. The color wheel of claim 1, wherein the metal piece is a round plate, its diameter being larger than an outer diameter of the phosphor wheel and smaller than an outer diameter of the color correction wheel.

6. The color wheel of claim 5, further comprising a mounting member, wherein the phosphor wheel and the color correction wheel are located on two different sides of the metal piece, and wherein the mounting member affixes the color correction wheel on the rotation shaft.

7. The color wheel of claim 6, further comprising a transparent glass plate disposed outside of the phosphor wheel.

8. The color wheel of claim 6, wherein the metal piece has a round rim extending about its periphery substantially parallel to an axis of the rotation shaft, wherein the rim forms a circle and the phosphor wheel is located within the circle.

9. The color wheel of claim 8, wherein the phosphor wheel includes a phosphor layer and a setting layer, wherein the setting layer restrains the phosphor layer within the circle formed by the metal piece.

10. The color wheel of claim 5, wherein the phosphor wheel and the color correction wheel are located on a same side of the metal piece.

11. The color wheel of claim 10, wherein the phosphor wheel is arranged concentric with the color correction wheel.

12. The color wheel of claim 11, further comprising a heat dissipation structure disposed on a side of the metal piece opposite the phosphor wheel and the color correction wheel.

13. The color wheel of claim 12, wherein the heat dissipation structure includes a plurality of spiral shaped blades forming an impeller.

* * * * *